(12) United States Patent
Dibb et al.

(10) Patent No.: US 10,453,024 B2
(45) Date of Patent: Oct. 22, 2019

(54) INCENTIVIZED GROUP SHIPPING SYSTEM

(71) Applicant: NISSAN NORTH AMERICA, INC., Franklin, TN (US)

(72) Inventors: Gregory D. Dibb, Mountain View, CA (US); Siddharth Thakur, Hyderabad (IN); Daisuke Saito, Kanagawa (JP)

(73) Assignee: Nissan North America, Inc., Franklin, TN (US)

( * ) Notice: Subject to any disclaimer, the term of this patent is extended or adjusted under 35 U.S.C. 154(b) by 553 days.

(21) Appl. No.: 15/166,953

(22) Filed: May 27, 2016

(65) Prior Publication Data
US 2017/0344940 A1    Nov. 30, 2017

(51) Int. Cl.
*G06Q 10/08* (2012.01)
*G08G 1/00* (2006.01)
*H04L 29/08* (2006.01)
*H04L 12/58* (2006.01)

(52) U.S. Cl.
CPC ..... *G06Q 10/0834* (2013.01); *G06Q 10/0838* (2013.01); *G08G 1/00* (2013.01); *H04L 67/12* (2013.01); *H04L 67/18* (2013.01); *H04L 67/303* (2013.01); *H04L 51/38* (2013.01)

(58) Field of Classification Search
CPC ............. G06Q 10/0834; G06Q 10/083; G06Q 10/0838; G06Q 10/08
See application file for complete search history.

(56) References Cited

U.S. PATENT DOCUMENTS

| 8,754,785 | B2 | 6/2014 | Rauscher et al. |
| 2002/0077876 | A1 | 6/2002 | O'Meara et al. |
| 2005/0228553 | A1* | 10/2005 | Tryon ..................... B60K 6/46 701/22 |
| 2007/0257774 | A1* | 11/2007 | Stumpert ............... G06Q 10/08 340/7.1 |

(Continued)

OTHER PUBLICATIONS

Tao, Chi-chung & Chen, Chun-ying, Dynamic Rideshare Matching Algorithms for the Taxipooling Service Based on Intelligent Transportation System Technologies, Aug. 20-22, 2007, International Conference on Management Science & Engineering, pp. 399-404 (Year: 2007).*

*Primary Examiner* — George Chen
*Assistant Examiner* — Wayne S. Murray
(74) *Attorney, Agent, or Firm* — Young Basile Hanlon & MacFarlane, P.C.

(57) ABSTRACT

Service requests are transmitted to multiple vehicles, each request associated with a time and a location. Driving histories of vehicles are known. A first location associated with a service request is compared with a known location in a vehicle driving history. The known location comprises a first cell identifier of a first grid where a size of the cells indicates a maximum acceptable deviation of the vehicle from a travel segment in the driving history that includes the first cell identifier. When the first location matches the known location and the associated time overlaps a start or end time of the travel segment that includes the first cell identifier, the service request is identified to the vehicle. The vehicle sends an indicator that it will perform at least a portion of a service, and an instruction is transmitted to the vehicle that causes the vehicle to perform the service.

19 Claims, 10 Drawing Sheets

(56) References Cited

U.S. PATENT DOCUMENTS

| | | | |
|---|---|---|---|
| 2008/0270019 A1* | 10/2008 | Anderson | G01C 21/3438 701/533 |
| 2009/0083111 A1* | 3/2009 | Carr | G06Q 10/047 705/7.13 |
| 2010/0088146 A1* | 4/2010 | Zhong | G01C 21/3484 701/25 |
| 2010/0305814 A1* | 12/2010 | Ichikawa | G07C 5/085 701/33.4 |
| 2013/0135088 A1* | 5/2013 | Simha | B60R 25/34 340/425.5 |
| 2013/0307979 A1 | 11/2013 | Chen et al. | |
| 2014/0129951 A1* | 5/2014 | Amin | G06Q 50/30 715/738 |
| 2015/0012320 A1* | 1/2015 | Juckett | G06Q 50/30 705/7.16 |
| 2015/0081587 A1* | 3/2015 | Gillen | G06Q 10/08355 705/338 |
| 2016/0025549 A1* | 1/2016 | Motoyama | G01G 19/414 177/1 |
| 2016/0189324 A1* | 6/2016 | Eramian | G06Q 50/30 705/13 |
| 2017/0185948 A1* | 6/2017 | Magazinik | G06Q 10/063118 |
| 2017/0330144 A1* | 11/2017 | Wakim | G01C 21/34 |

\* cited by examiner

| REQUEST USER ID | GPS POINT | TIME RANGE |
|---|---|---|
| R_ID_1 | GPS_A | 2/22/16 8:00 TO 2/22/16 8:30 |

FIG. 5A

| REQUEST USER ID | GRID CENTER FOR USER ID_1 | TIME RANGE | DAY OF WEEK |
|---|---|---|---|
| R_ID_1 | GPS_A_GRID_CENTER_USING_ID_1_GRID | 8 - 8.5 | MON |

FIG. 5B

| USER ID | START GRID CENTER | END GRID CENTER | START DAY OF WEEK | END DAY OF WEEK | START TIME RANGE | END TIME RANGE |
|---|---|---|---|---|---|---|
| ID_1 | GPS_GRID_CENTER_S1 | GPS_GRID_CENTER_E1 | MON | MON | 7.5 - 8 | 7.75 - 8.25 |
| ID_1 | GPS_GRID_CENTER_S1 | GPS_GRID_CENTER_E2 | TUES | TUES | 7.4 - 8 | 7.65 - 8.25 |
| ... | ... | ... | ... | ... | ... | ... |

FIG. 5C

| GPS POINT | TIMESTAMP |
|---|---|
| P1 | T1 |
| P2 | T2 |
| P3 | T3 |
| P4 | T4 |
| P5 | T5 |
| P6 | T6 |
| ... | ... |

| GPS POINT | TIMESTAMP | CELL CENTER |
|---|---|---|
| P1 | T1 | C1 |
| P2 | T2 | C2 |
| P3 | T3 | C3 |
| P5 | T5 | C4 |
| (P5+P6)/2 | (T5+T6)/2 | C5 |
| P6 | T6 | C6 |
| ... | ... | ... |

| CONTIUOUS SEGMENT ID | START GRID CENTER | END GRID CENTER | START TIMESTAMP | END TIMESTAMP | START DAY OF WEEK | END DAY OF WEEK | START TIME OF DAY | END TIME OF DAY |
|---|---|---|---|---|---|---|---|---|
| 1 | C1 | C2 | T1 | T2 | DOW(T1) | DOW(T2) | TOD(T1) | TOD(T2) |
| 2 | C1 | C3 | T1 | T3 | DOW(T1) | DOW(T3) | TOD(T1) | TOD(T3) |
| ... | ... | ... | ... | ... | ... | ... | ... | ... |

FIG. 9

INCENTIVIZED GROUP SHIPPING SYSTEM

TECHNICAL FIELD

This disclosure relates to vehicle operation, including matching the driving history of the vehicle with services, to implement a shipping system that reduces energy consumption.

BACKGROUND

Millions of miles are driven daily by commuters with available trunk or cargo space. Further, there is a large market for moving, e.g., small and medium-sized packages over relatively close distances. Currently, moving such packages is achieved by dedicated delivery agents.

SUMMARY

Disclosed herein are aspects, features, elements, implementations, and embodiments of an incentivized group shipping system.

A method described herein comprises transmitting service requests to multiple vehicles, each service request associated with a respective first time and with a respective location, and driving histories of at least some of the multiple vehicles being known. The method also includes comparing a first location associated with a first service request with a known location in a first driving history of at least a first vehicle of the multiple vehicles, the known location comprising a first cell identifier of a first grid, the first grid comprising cells, and a size of the cells of the first grid indicating a maximum acceptable deviation of the first vehicle from a travel segment in the first driving history that includes the first cell identifier. The method includes, upon conditions that the first location matches the known location and the first time associated with the first location overlaps a start time or an end time of the travel segment that includes the first cell identifier, identifying the first service request to the first vehicle, receiving, from the first vehicle, an indicator that the first vehicle will perform a service associated with a service request, and transmitting an instruction to the first vehicle that causes the first vehicle to perform at least a portion of the service.

An apparatus described herein comprises a processor and a memory storing instructions causing the processor to perform a method comprising transmitting service requests to multiple vehicles, each service request associated with a respective first time and with a respective location, and driving histories of at least some of the multiple vehicles being known, and comparing a first location associated with a first service request with a known location in a first driving history of at least a first vehicle of the multiple vehicles, the known location comprising a first cell identifier of a first grid, the first grid comprising cells, and a size of the cells of the first grid indicating a maximum acceptable deviation of the first vehicle from a travel segment in the first driving history that includes the first cell identifier. The method also includes, upon conditions that the first location matches the known location and the first time associated with the first location overlaps a start time or an end time of the travel segment that includes the first cell identifier, identifying the first service request to the first vehicle, receiving, from the first vehicle, an indicator that the first vehicle will perform a service associated with a service request, and transmitting an instruction to the first vehicle that causes the first vehicle to perform at least a portion of the service.

Another apparatus described herein comprises a processor and a memory storing instructions causing the processor to perform a method comprising transmitting service requests to multiple vehicles, at least some of the service requests associated with a start time, an end time, a start location, and an end location, and driving histories of at least some of the multiple vehicles being known, and comparing each of the start location and the end location associated with a first service request with known locations in a first driving history of at least a first vehicle of the multiple vehicles, the known locations comprising start cell identifiers and end cell identifiers of a first grid that represent starting locations and ending locations for a plurality of travel segments derived from the first driving history, the first grid comprising cells, and a size of the cells of the first grid indicating a maximum acceptable deviation of the first vehicle from a travel segment of the plurality of travel segments. The method also includes, upon conditions that the start location of the first service request matches a first start cell identifier of a first travel segment of the plurality of travel segments, the end location of the first service request matches a first end cell identifier of the first travel segment, the start time of the first service request overlaps a first start time of the first travel segment, and the end time of the first service request overlaps a first end time of the first travel segment, identifying the first service request to the first vehicle, receiving, from the first vehicle, an indicator that the first vehicle will perform a service associated with a service request, and transmitting an instruction to the first vehicle that causes the first vehicle to perform at least a portion of the service.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings.

FIGS. 5A to 5C are tables showing how a request with a single location is matched to a vehicle travel segment.

FIG. 9 is a table showing driving segments resulting from the method of FIG. 6.

DETAILED DESCRIPTION

In a service that involves one or two points in a vehicle transportation network, such as a package delivery service, the service may be combined with other services involving one or both of the two points. In general, however, a dedicated trip may be required for each service. Every day, dozens of vehicles travel from a point of origin to a destination in a vehicle transportation network. Their empty trunk or cargo space is a wasted resource.

The teachings herein describe techniques that allow repetitive travel segments of vehicles to be used to identify services that could be performed during these travel segments. This provides additional value to vehicle (e.g., passenger car) owners at minimal or no additional effort. It reduces waste of energy and emissions to the transportation network overall. Further, the techniques herein have the possibility of reducing the cost of moving small or medium packages and provide greater flexibility for short haul (also called last mile) deliveries through the expansion of service providers.

Figure 1:
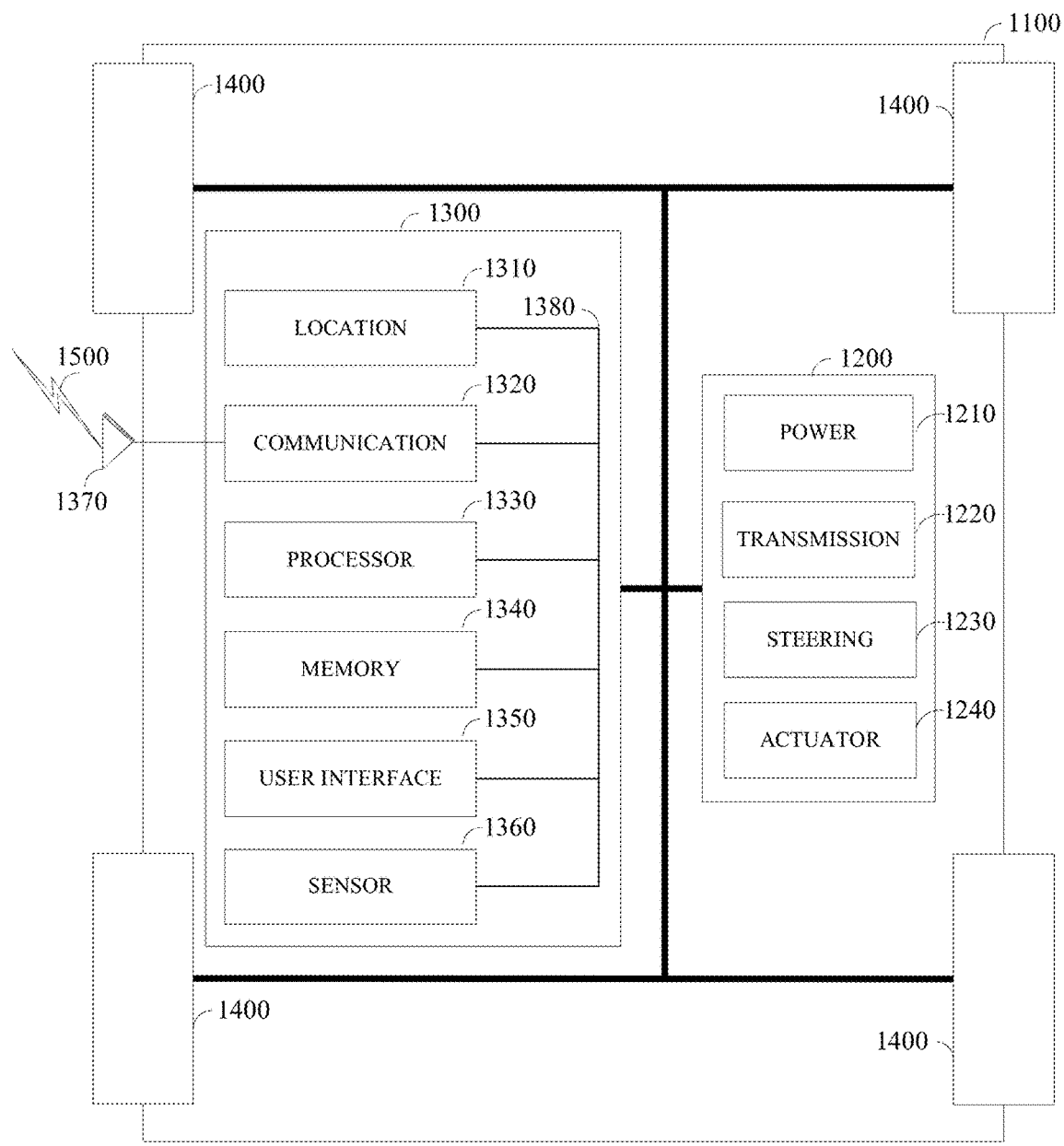
FIG. 1 is a diagram of an example of a portion of a vehicle in which the aspects, features, and elements disclosed herein may be implemented.

FIG. 1 is a diagram of an example of a vehicle 1000 in which the aspects, features and elements disclosed herein may be implemented. In some embodiments, the vehicle 1000 may include a chassis 1100, a powertrain 1200, a controller 1300, wheels 1400, or any other element or combination of elements of a vehicle. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300 and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 may include a power source 1210, a transmission 1220, a steering unit 1230, an actuator 1240, or any other element or combination of elements of a powertrain, such as a suspension, a drive shaft, axles or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1210 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the controller 1300, the actuator 1240, or both. The steering unit 1230 may be controlled by the controller 1300, the actuator 1240, or both, and may control the wheels 1400 to steer the vehicle 1000. The vehicle actuator 1240 may receive signals from the controller 1300 and may actuate or control the power source 1210, the transmission 1220, the steering unit 1230, or any combination thereof to operate the vehicle 1000.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof, may be integrated in one or more electronic units, circuits or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 is operatively coupled with the location unit 1310, the memory 1340, the electronic communication interface 1370, the electronic communication unit 1320, the user interface 1350, the sensor 1360, the powertrain 1200, or any combination thereof. For example, the processor is operatively coupled with the memory 1340 via a communication bus 1380.

The memory 1340 may include any tangible non-transitory computer-usable or computer-readable medium capable of, for example, containing, storing, communicating, or transporting machine-readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface 1370 may be configured to communicate via multiple communication links.

The communication unit 1320 is configured to transmit or receive signals via the wired or wireless medium 1500, such as via the communication interface 1370. Although not explicitly shown in FIG. 1, the communication unit 1320 may be configured to transmit, receive, or both, via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used.

The location unit 1310 may determine geolocation information, such as longitude, latitude, elevation, direction of travel, or speed, of the vehicle 1000. For example, the location unit includes a global positioning system (GPS) unit, such as a Wide Area Augmentation System (WAAS) enabled National Marine Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 can include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person and/or a touch display for performing visual and touch-based communication with the person.

The sensor 1360 often includes one or more sensors 1360, such as an array of sensors, which are operable to provide information that is used to control the vehicle 1000. The sensor 1360 may provide information regarding current operating characteristics of the vehicle. When multiple sensors 1360 are included, they can include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1000.

In some embodiments, the sensors 1360 include one or more sensors that are operable to obtain information regarding the physical environment surrounding the vehicle 1000. For example, one or more sensors 1360 may detect road geometry and obstacles, such as fixed obstacles, vehicles and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, in some embodiments, the vehicle 1000 includes a trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller outputs signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both.

The trajectory controller may be implemented, at least in part, using one or more elements of the controller 1300.

One or more of the wheels 1400 may be a steered wheel, which is pivoted to a steering angle under control of the steering unit 1230, a propelled wheel, which is torqued to propel the vehicle 1000 under control of the transmission 1220, or a steered and propelled wheel that may steer and propel the vehicle 1000.

Although not shown in FIG. 1, the vehicle 1000 may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof. For example, a cellular phone may be coupled to the vehicle 1000 through a Bluetooth® module.

Figure 2:
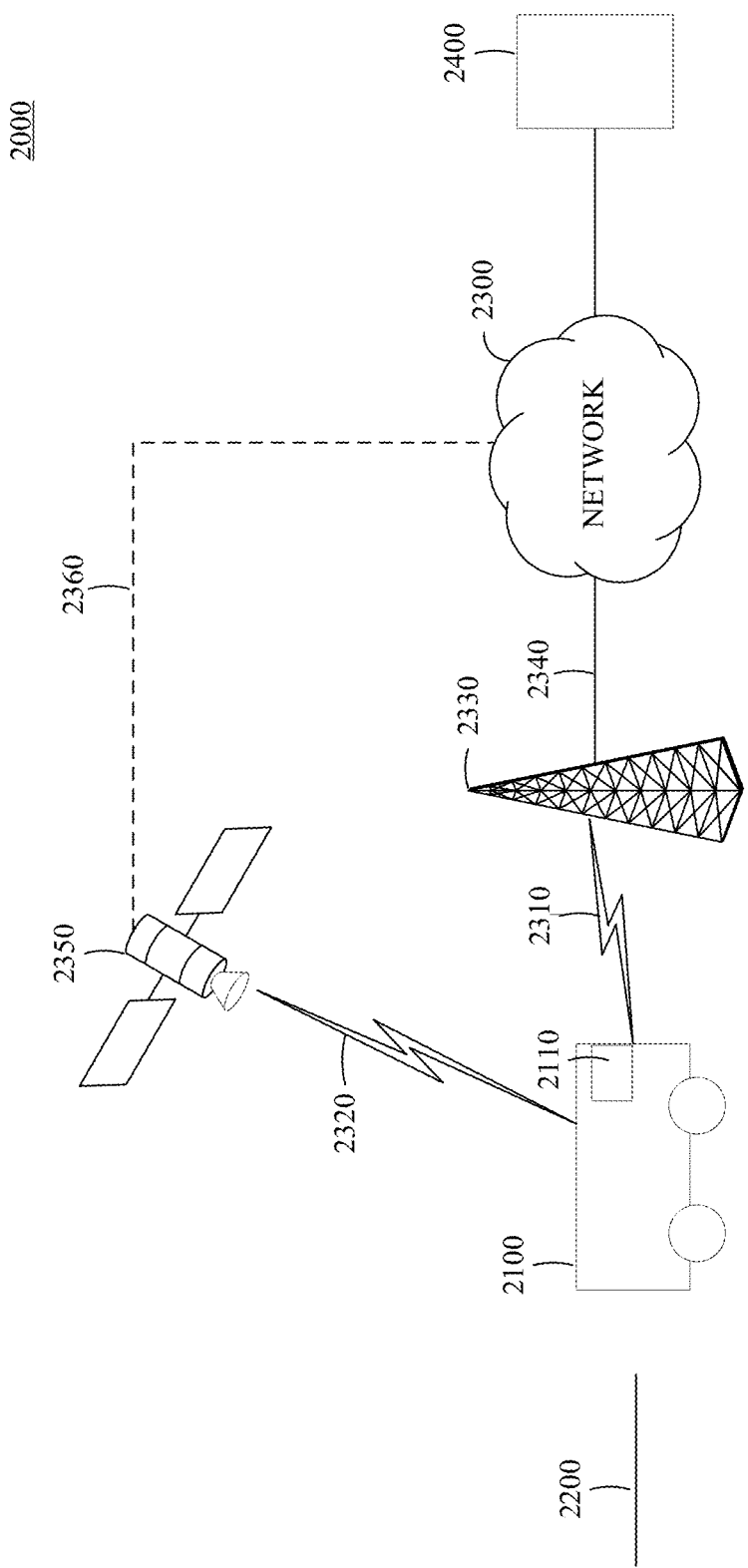
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 shown includes a vehicle 2100, which may be configured similarly to the vehicle 1000 shown in FIG. 1, that travels via one or more portions of one or more vehicle transportation networks 2200, and communicates via one or more electronic communication networks 2300. Although not explicitly shown in FIG. 2, a vehicle may traverse an area that is not expressly or completely included in a vehicle transportation network, such as an off-road area.

In some embodiments, the electronic communication network 2300 is, for example, a multiple access system and provides for communication, such as voice communication, data communication, video communication, messaging communication, or a combination thereof, between the vehicle 2100 and one or more communicating devices 2400. For example, the vehicle 2100 receives information, such as information representing the vehicle transportation network 2200, from a communicating device 2400 via the network 2300. The vehicle 2100 includes a cargo carrier 2110 with external access that can be remotely controlled (i.e., opened and closed). In this example, the cargo carrier 2110 is an enclosure mounted on the vehicle 2100 with external access, but the cargo carrier could be a trunk or other secured portion of the vehicle 2100. One example of a cargo carrier 2110 that has external access, but can be arranged to not have access to the interior of the vehicle itself is shown in U.S. Pat. No. 6,966,593 B2, which is incorporated herein in its entirety by reference.

The vehicle 2100 may communicate via a wired communication link (not shown), a wireless communication link 2310/2320/2370, or a combination of any number of wired or wireless communication links. For example, as shown, the vehicle 2100 communicates via a terrestrial wireless communication link 2310, via a non-terrestrial wireless communication link 2320, or via a combination thereof. In some implementations, the terrestrial wireless communication link 2310 may include an Ethernet link, a serial link, a Bluetooth link, an infrared (IR) link, an ultraviolet (UV) link, or any link capable of providing for electronic communication.

In some embodiments, the vehicle 2100 communicates with the communications network 2300 via an access point 2330. The access point 2330, which may include a computing device, may be configured to communicate with a vehicle 2100, with a communication network 2300, with one or more communication devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the vehicle 2100 communicates with the communications network 2300 via a satellite 2350, or other non-terrestrial communication device. The satellite 2350, which may include a computing device, is configured to communicate with the vehicle 2100, with the communication network 2300, with one or more communication devices 2400, or with a combination thereof via one or more communication links 2320/2360. Although shown as a single unit, a satellite may include any number of interconnected elements.

The electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, the vehicle 2100 identifies a portion or condition of the vehicle transportation network 2200. For example, the vehicle may include one or more on-vehicle sensors, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, the vehicle 2100 traverses a portion or portions of one or more vehicle transportation networks 2200 using information communicated via the network 2300, such as information representing the vehicle transportation network 2200, information identified by one or more on-vehicle sensors, or a combination thereof.

Although, for simplicity, FIG. 2 shows one vehicle transportation network 2200, one electronic communication network 2300, and one communication device 2400, any number of networks or communication devices may be used. In some embodiments, the vehicle transportation and communication system 2000 includes devices, units or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, each vehicle 2100 may communicate with the communication device 2400 via a direct communication link, such as a Bluetooth communication link.

Figure 3:
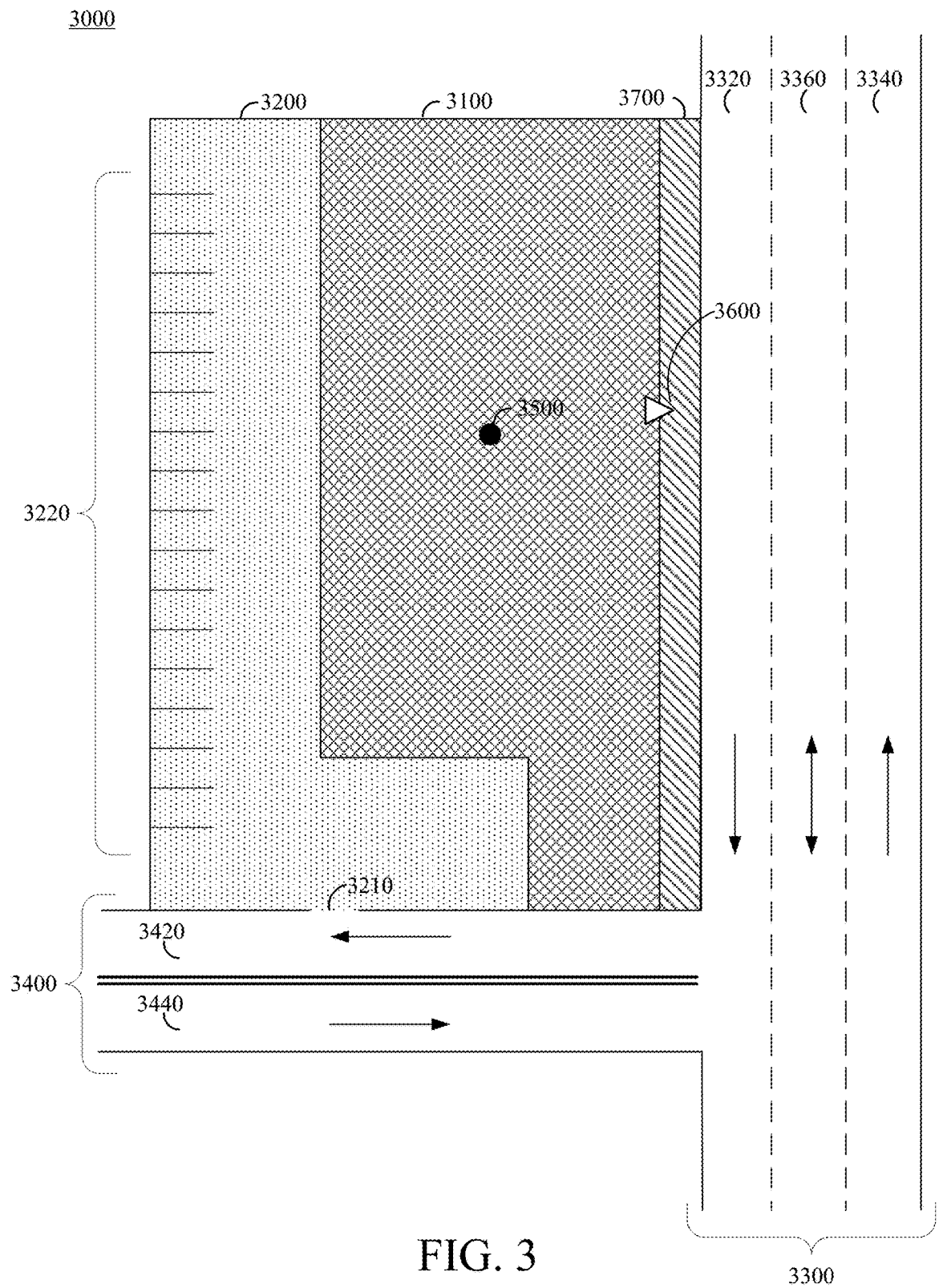
FIG. 3 is a diagram of a portion of a vehicle transportation network in accordance with this disclosure.

FIG. 3 is a diagram of a portion of a vehicle transportation network 3000 in accordance with this disclosure. A vehicle transportation network 3000 may include one or more unnavigable areas, such as a building 3100, one or more partially navigable areas, such as parking area 3200, one or more navigable areas, such as roads 3300/3400, or a combination thereof. A vehicle, which could be an autonomous vehicle, traverses a portion or portions of the vehicle transportation network 3000.

The vehicle transportation network may include one or more interchanges 3210 between one or more navigable, or partially navigable, areas 3200/3300/3400. For example, the portion of the vehicle transportation network shown in FIG. 3 includes an interchange 3210 between the parking area 3200 and road 3400. In some embodiments, the parking area 3200 includes parking slots 3220.

A portion of the vehicle transportation network, such as the roads 3300/3400, includes one or more lanes 3320/3340/3360/3420/3440, and may be associated with one or more directions of travel, which are indicated by arrows in FIG. 3.

In some embodiments, a vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, or a combination thereof.

In some embodiments, a portion, or a combination of portions, of the vehicle transportation network may be identified as a point of interest or a destination. For example, the vehicle transportation network information identifies the building 3100 as a point of interest, the vehicle transportation network information and/or the vehicle identifies the point of interest as an origin (start point or location) or a destination (end point or location), and the vehicle travels from an origin to a destination by traversing the vehicle transportation network.

The identification of a start point or an end point may include identifying a discrete uniquely identifiable geolocation, such as the geographic location 3500 for the building 3100. For example, the vehicle transportation network may include a defined location, such as a street address, a postal address, a vehicle transportation network address, a longitude and latitude, or a GPS address, for the start or end point. In some embodiments, the defined location is associated with one or more entrances, such as the entrance 3600 shown in FIG. 3. The vehicle transportation network information may include defined or predicted entrance location information, such as information identifying a geolocation of an entrance associated with the location.

In some embodiments, the vehicle transportation network may be associated with, or may include, a pedestrian transportation network. A pedestrian transportation network may include pedestrian navigable areas. For example, FIG. 3 includes a portion 3700 of a pedestrian transportation network, which is a pedestrian walkway or sidewalk. The pedestrian walkway or sidewalk may correspond with a non-navigable area of the vehicle transportation network 3000. Although not shown separately in FIG. 3, a pedestrian navigable area, such as a pedestrian crosswalk, may correspond with a navigable area, or a partially navigable area, of the vehicle transportation network 3000.

Figure 4:
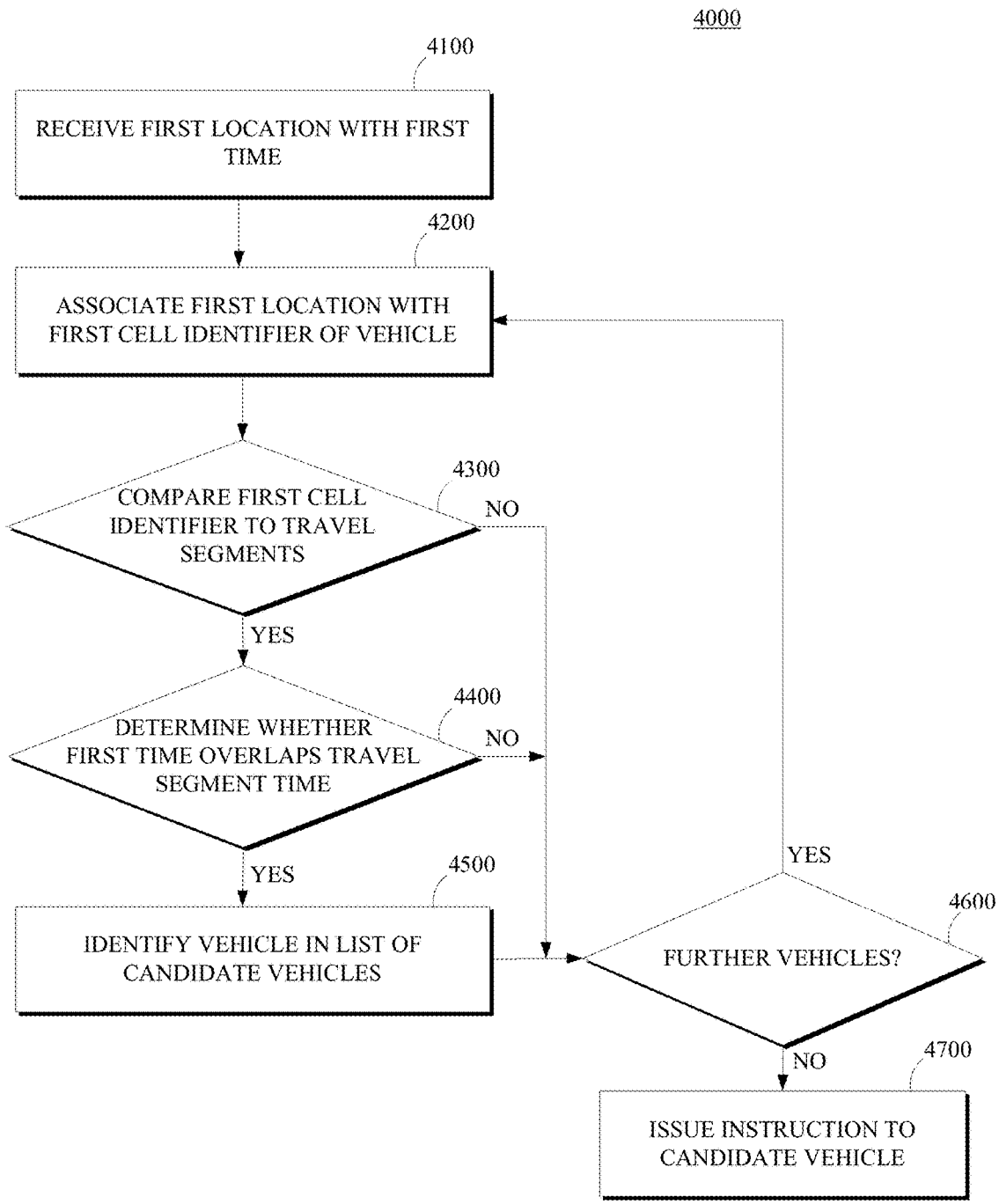
FIG. 4 is a flow chart diagram showing a method of matching a vehicle driving history to a service.

FIG. 4 is a flow chart diagram showing a method 4000 of matching a vehicle driving history to a service. This is one example of a method of matching a vehicle driving history to a service, and many variations in the method 4000 shown are available and described below. The method 4000 may be implemented in a vehicle, such as the vehicle 1000 shown in FIG. 1 or the vehicle 2100 shown in FIG. 2. For example, the processor 1330 of the controller 1300 of the vehicle 1000 shown in FIG. 1 may execute instructions stored on the memory 1340 of the controller 1300 to perform the method 4000. Alternatively, the method 4000 is implemented in whole or in part by a controller or other computing device of the communication device 2400 of FIG. 2, or other external control source, that receives input signals from the vehicle or its operator and from service users, and that transmits output signals to the vehicle or its operator and to service users. The processing of FIG. 4 and/or its variations may be performed periodically, upon inclusion of a new service request or a new service provided, or on demand.

At 4100, a first location associated with a first time is received at the controller. The first location is a point of interest for a service. It may be, for example, GPS coordinates or another unique identifier for a location. Often, it is an address, such as an address associated with the building 3100. The first time may be a single defined time, or may be a time range or time window. In addition to a time of day, the first time may include or be associated with a day of week.

The first location and the first time is received from a service user, and is associated with a service. For example, the first location may be a start location or an end location of a trip between two points, such as the location at which a package is to be picked up or delivered. In this case, the first time may be a start time or an end time. The service user is any individual or business, and may be an operator of a vehicle.

The method 4000 associates the first location with a first cell identifier of a grid at 4200. The grid comprises cells, and at least some of the cells are associated with trips previously taken by a vehicle. A size of the cells of the grid indicate a maximum acceptable deviation distance from a travel segment generated using the trips. Generating the travel segments and the grid are discussed in more detail hereinafter with respect to FIGS. 6-9.

The vehicle is one of multiple vehicles that have made themselves available to supply a service that involves the transportation network information, such as package delivery between two points.

Referring next to FIGS. 5A-5C, which are tables showing how a request with a single location is matched to a vehicle travel segment, the tables may also be used to explain the first two operations of the method 4000 of FIG. 4. While the data is stored in table formats in this example, there is no requirement that the data be stored in this format. Instead, the data may be stored in any format as long as it is available for the processing described herein.

The first column of FIG. 5A lists a request identifier. In this case, the request identifier is associated with a particular service user, R_ID_1. The second column is the location for the service, which is shown in this example as a GPS point (GPS_A). While the location is a GPS point here, it may be entered by a service user as an address, etc., and then be converted to GPS coordinates at 4100 for storage in the table or in another format in memory. The final column of FIG. 5A is a time for the service. Like the first time described at 4100 in FIG. 4, the time may be received from the service user. In this example, a date is also listed.

FIG. 5B shows the service request after the data of FIG. 5A is converted for easier comparison by associating the first location with the grid definitions, and specifically with a first cell identifier, for a service provider. In this example, the service provider is the vehicle of user ID_1 as described below with respect to FIG. 5C.

Referring to FIG. 5B, the first column is the user identifier of the service user, as in FIG. 5A. The second column shows the association of the location (e.g., the first location) with a first cell identifier of the grid. The grid is discussed below. At this point in the description, it is sufficient to note that the location (GPS_A) is associated with the cell of the grid having the closest center point to the location, labeled GPS_A_GRID_CENTER_USING_ID_1_GRID. The third and fourth columns convert the time range of FIG. 5A to a time range and a day of week. As shown in the third column of FIG. 5B, the time of day is a floating point value between 0 and 23.99, which corresponds to 00:00 to 23:59 (or midnight to 11:59 pm). The day of week of the fourth column corresponds to the date in FIG. 5A.

FIG. 5C is a table including a number of travel segments of a vehicle generated from a driving history of the vehicle. Only two travel segments are shown, but often there are more than two for a vehicle. The first column in FIG. 5C is the user identifier of the service provider, here ID_1. The second and third columns respectively list the start center and the end grid center for each travel segment, here travel segment 1 (S1 and E1) and travel segment 2 (S2 and E2). These values may be referred to as cell identifiers and are shown as GPS coordinates. However, they can be another unique location identifier, preferably in the same format at the used for the service requests for comparison purposes. The fourth and fifth columns respectively list the start day of week and the end day of week for the travel segments. Commonly, the start and end days of the week will be the same, but this is not a requirement. The final two columns respectively list the start time range and the end time range for the travel segments. The time ranges or windows are listed using floating point values.

Referring again to FIG. 4, after the first location is associated with the first cell identifier at 4200, the method 4000 compares the first cell identifier to travel segments generated based on the trips previously taken by the vehicle at 4300. Similar to as seen in FIG. 5C, each travel segment may be identified by a start cell identifier of the grid, a start time associated with the start cell identifier, an end cell identifier of the grid, and an end time associated with the end cell identifier. If the first cell identifier is not equal to either of the start cell identifier or the end cell identifier, the method 4000 advances to 4600 to determine whether there are further vehicles that meet the conditions of the first location and first time.

In contrast, and upon a condition that the first cell identifier is equal to one of the start cell identifier or the end cell identifier for any single travel segment, the method 4000 advances to 4400 to determine whether the first time overlaps the start time or the end time associated with the one of the start cell identifier or the end cell identifier. For example, the first time overlaps the start time or the end time, if they are each single times, if the first time is equal to the start time or the first time is equal to the end time within a few minutes (e.g., up to 10 minutes). More commonly, at least the start time and the end time are ranges of value. In this case, the first time overlaps the start time if the first time is within the start time range, and the first time overlaps the end time if the first time is within the end time range. At 4400, the first time is compared to the start time when the first location matches the start cell identifier. Similarly, the first time is compared to the end time when the first location matches the end cell identifier.

If the first time does not overlap the appropriate travel segment time at 4400, the method 4000 advances to 4600 to determine whether there are further vehicles that meet the conditions of the first location and first time. Otherwise, the first time overlaps the start time or the end time associated with the one of the start cell identifier or the end cell identifier, so the method 4000 advances to 4500 where the vehicle is identified in a list of candidate vehicles for the service associated with the first location and the first time. The method 4000 then advances to 4600. In one implementation, the vehicle is notified of details related to the service responsive to identifying the vehicle in the list of candidate vehicles for the service.

Once all of the vehicles are considered for a match to the conditions of the service (as indicated by a "no" in response to the query of 4600), the method 4000 advances to 4700 to transmit an instruction to a candidate vehicle in the list that causes the candidate vehicle to perform at least a portion of the service. Where the service request comprises a request for a package delivery, for example, the instruction may comprise an instruction that causes a cargo carrier of the candidate vehicle to open and/or close. Referring to FIGS. 1 and 2, the instruction may be transmitted from a communication device 2400 to the vehicle 2100 through a communicating device 2400 via the network 2300 to open or close the cargo carrier 2110. Other instructions that may be transmitted to the candidate vehicle include driving instructions that are provided to the controller 1300 through input signals to its electronic communication interface 1370. These may be used in a mapping unit of the vehicle. If the vehicle is an autonomous vehicle, the driving instructions may be provided to a trajectory controller to control the powertrain 1200 to get to the first location.

The method 4000 of FIG. 4 shows the conditions associated with the service being a first location and a first time, but other conditions may be considered. The location may also be associated with a day as shown in FIG. 5B, and each travel segment may be associated with a start day and an end day as shown in FIG. 5C. In this case, the day of week is also used in a comparison to determine whether the vehicle is a candidate vehicle to perform the service. For example, when the location is first day, it is determined that the first time does not overlap the start time when the first day does not match the start day, and it is determined that the first time does not overlap the end time when the first day does not match the end day. When the first day matches the start day or the end day, the times of day can be compared. Upon a condition that the first day matches the start day (and assuming that the location matches the start location of a travel segment), determining whether the first time overlaps the start time or the end time associated with the one of the start cell identifier or the end cell identifier can include determining that the first time matches the start time when the first time overlaps the start time. Where the start time is a start time range, the first time matches the start time when the first time falls within the start time range. Similarly, upon a condition that the first day matches the end day (and assuming that the location matches the end location of a travel segment), determining whether the first time overlaps the start time or the end time associated with the one of the start cell identifier or the end cell identifier can include determining that the first time matches the end time when the first time overlaps the end time. Where the end time is an end time range, the first time matches the end time when the first time falls within the end time range.

The flow chart of FIG. 4 shows an example where a first location associated with a service is used to determine whether the vehicle is a suitable candidate for the service. Another implementation receives a second location associated with a second time subsequent to the first time, where the service is associated with the second location and the second time. In this example, and for each vehicle of the multiple vehicles, the second location is associated with a second cell identifier of the grid. Similarly to the association of the first location with the first cell identifier, the second location may be associated with the cell of the grid having the closest center point. Then, the comparison is done for this additional data associated with the service. Optionally, the start time, the end time, or both, may be used for matching. For example, the vehicle operator may be willing to go outside their normal time for the start or the end of a travel segment in order to perform the service.

If only one of the times needs to match, then upon the conditions that the first cell identifier is equal to the start cell identifier of a first travel segment, the first time overlaps the start time or the end time, whichever is appropriate, and the second cell identifier is equal to the end cell identifier of the first travel segment, the vehicle is identified in the list of candidate vehicles for the service. If both of the times need to match, then upon the conditions that the first cell identifier is equal to the start cell identifier of a first travel segment, the second cell identifier is equal to the end cell identifier of the first travel segment, the first time overlaps the start time, and the second time overlaps the end time, the vehicle is identified in the list of candidate vehicles for the service.

These comparisons may be visualized with reference to FIGS. 5B and 5C. The location associated with the request shown in FIG. 5B may be compared with the travel segments of FIG. 5C by comparing the grid cell identifier in the second column of FIG. 5B with the grid cell identifiers of the second and third columns of FIG. 5B. Similarly, and when present, the day of week of the fourth column of FIG. 5B may be compared with the corresponding start or end day of week that corresponds with whichever of the start grid center or end grid center of the FIG. 5C, if any, matches the grid cell identifier of FIG. 5B. If the day of week also has a match, in addition to the location match, the time range of the third column of FIG. 5B may be compared with the corresponding start or end time range that corresponds with whichever of the start grid center or end grid center of the FIG. 5C matches the grid cell identifier of FIG. 5B. If a second location, second time, and optionally second day are received, then the data associated with the first location is compared to the start grid center, start day of week, and start time range, while the data associated with the second location is compared to the end grid center, the end day of week, and end time range.

Figure 6:
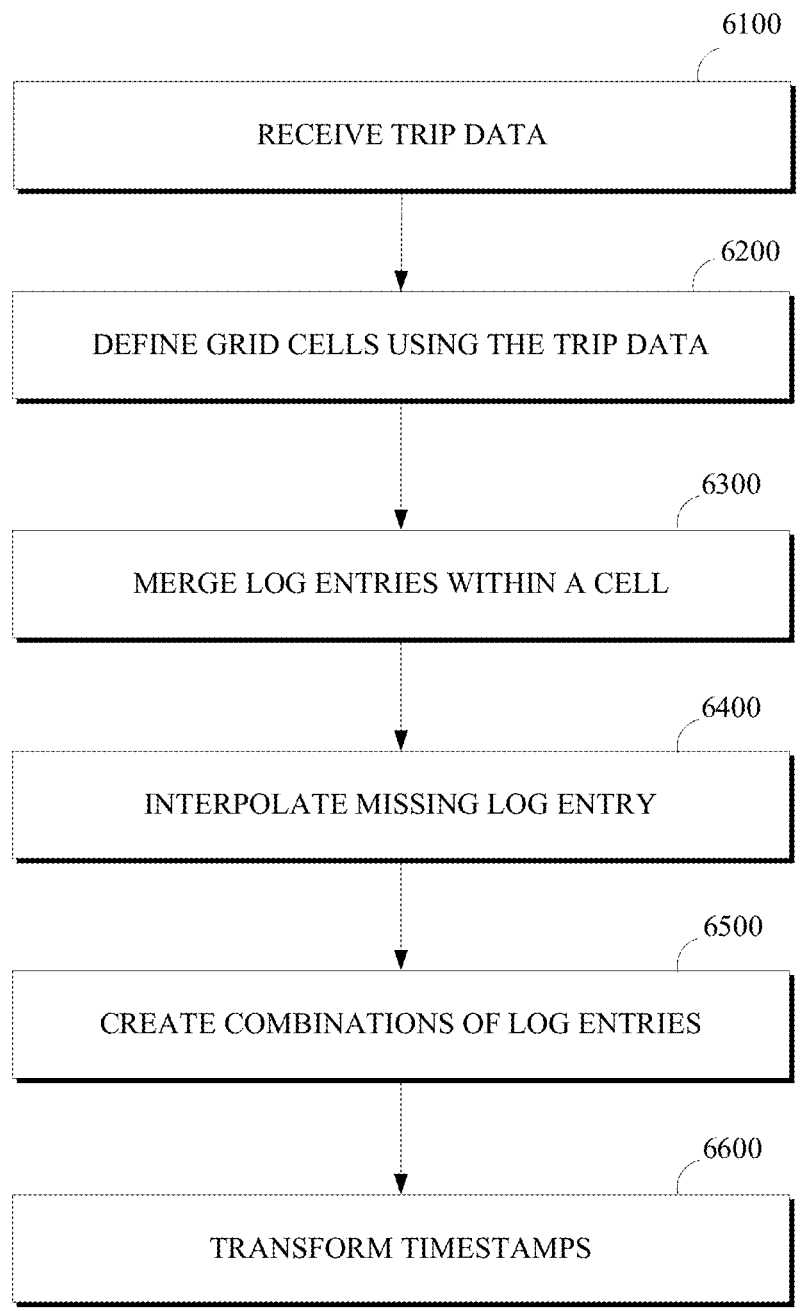
FIG. 6 is a flow chart diagram showing a method of processing vehicle driving history into driving segments.

Techniques for generating the travel segments are also described herein. FIG. 6 is a flow chart diagram showing a method 6000 of processing vehicle driving history into driving segments. The method 6000 may be implemented in a vehicle, such as the vehicle 1000 shown in FIG. 1 or the vehicle 2100 shown in FIG. 2. For example, the processor 1330 of the controller 1300 of the vehicle 1000 shown in FIG. 1 may execute instructions stored on the memory 1340 of the controller 1300 to perform the method 6000. Alternatively, the method 6000 is implemented in whole or in part by a controller or other computing device of the communication device 2400 of FIG. 2, or other external control source, that receives input signals from the vehicle or its operator and from service users, and that transmits output signals to the vehicle or its operator and to service users. The variations in and alternatives to the method 6000 of processing vehicle driving history into driving segments are also described herein as the method 6000 is only an example. Processing vehicle driving history into driving segments may be performed periodically or on demand.

At 6100, trip data is received. More particularly, log entries for trips taken by the vehicle may be received at, e.g., periodic, intervals. The log entries may be collected for used in the method 6000 at, for example, 30 second intervals. A trip may be defined as starting upon a turning on of an ignition and ending upon a turning off of the ignition. Each log entry comprises a current timestamp and a current position of the vehicle, but may include other information such as distance travelled since the last log entry, energy used since the last log entry, or other vehicle settings or road condition parameters.

At 6200, grid cells are defined using the trip data by approximating the current position of at least some log entries of the trip data to grid center points of the grid. This may be seen by reference to FIGS. 7A to 7C, which are maps used to explain the method of FIG. 6, and by reference to FIGS. 8A and 8B, which are tables used to explain the method of FIG. 6.

Figure 7A:
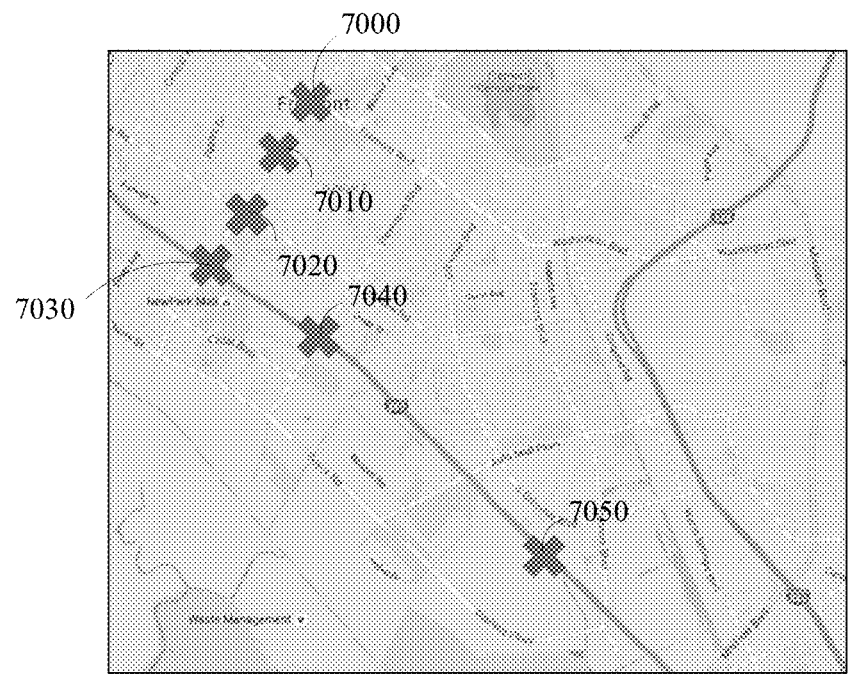
FIGS. 7A to 7C are maps used to explain the method of FIG. 6.

In FIG. 7A, one trip is shown by example. The locations marked with an "X" in FIG. 7A are the positions of the vehicle when log entries were obtained, and the log entries may be referred to as log entries 7000-7050. In this example, the log entry 7000 includes the start location or position, and the log entry 7050 includes the end location or position. The log entries 7000-7050 are associated with respective GPS points P1-P6 and respective timestamps T1-T6 as shown in FIG. 8A.

Figure 7B:
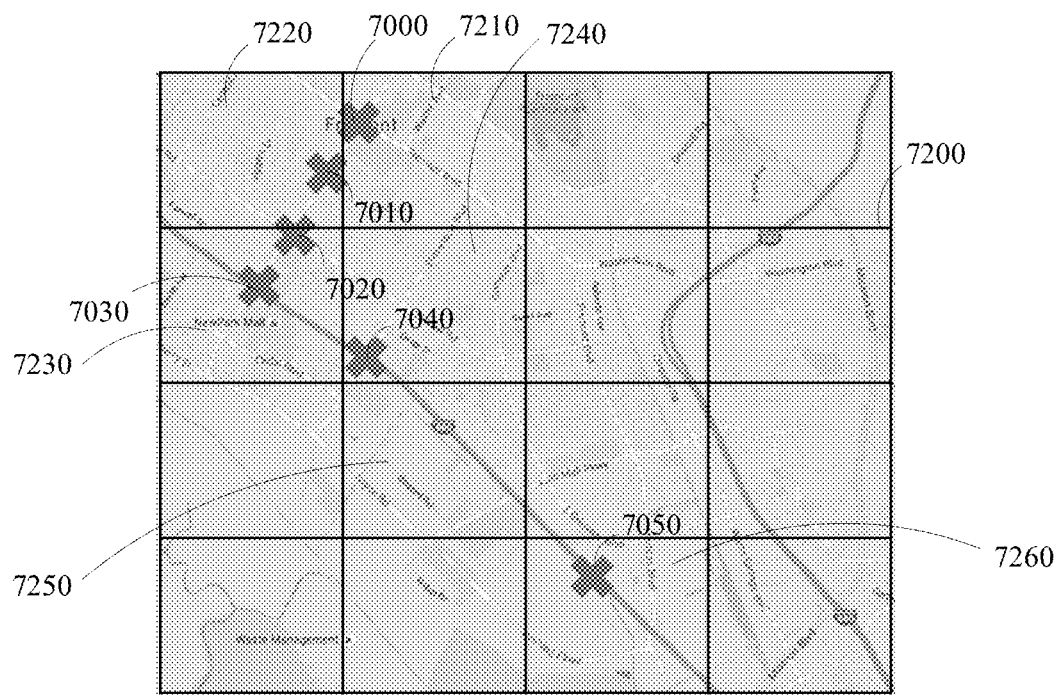
Figures 7C, 8A, 8B:
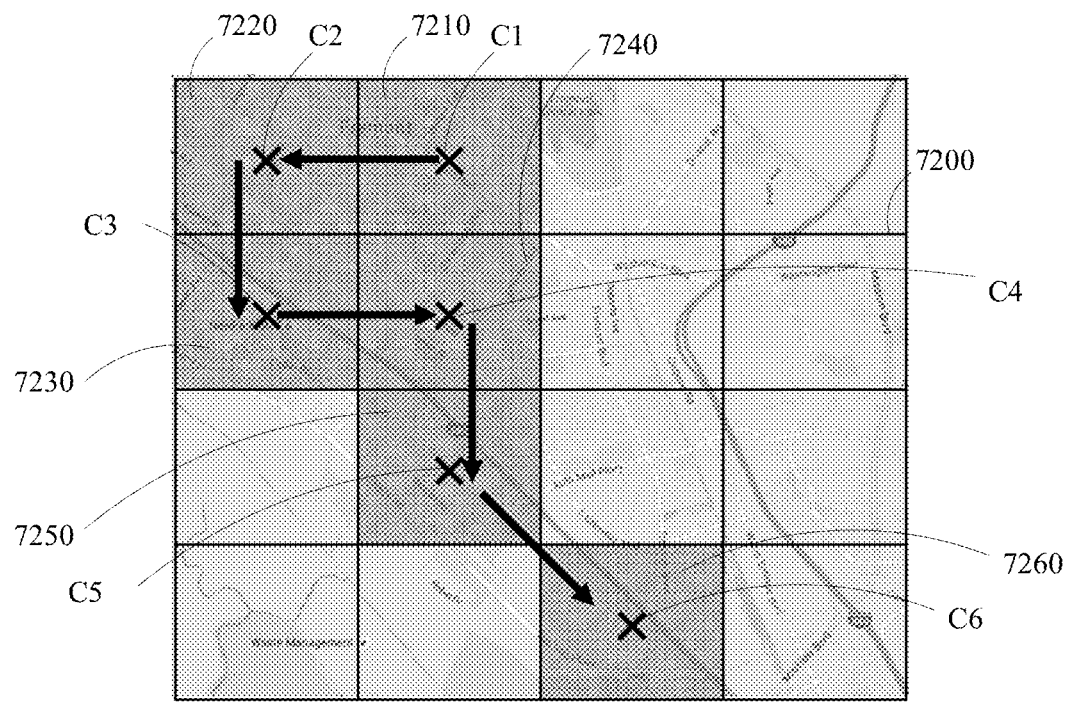
FIGS. 8A and 8B are tables used to explain the method of FIG. 6.

Referring to FIG. 7B, the log entries 7000-7050 are shown in a relation to a grid 7200. As mentioned in the description of FIG. 4, the grid comprises cells, and at least some of the cells are associated with trips previously taken by the vehicle. Each of the cells has a unique grid cell identifier. In one implementation, GPS coordinates are used as the grid cell identifiers. In FIG. 7B, only those cells of the grid 7200 along the trip associated with the log entries 7000-7050 are labeled, namely cells 7210-7260. This can be seen more clearly in FIG. 7C, which highlights cells 7210-7260 and marks their respective grid cell centers.

Referring back to FIG. 6, the method 6000 approximates the current position of at least some log entries 7000-7050 of the trip data to grid center points of the grid 7200 by selecting the single log entry having a location closest to the center of a cell to associate with that cell. Here, approximates can mean associates or identifies. In FIGS. 7B and 8B, for example, the only log entry 7000 (having GPS point P1 and timestamp T1) located within the bounds of cell 7210 is associated with grid center point C1, which is referred to as the grid cell identifier C1 of cell 7210. Similarly, the only log entry 7010 (having GPS point P2 and timestamp T2) located within the bounds of cell 7220 is associated with grid center point C2, which is referred to as the grid cell identifier C2 of cell 7220.

The next two log entries 7020, 7030 both fall within the bounds of the cell 7230. A decision is made between these two log entries. In one implementation, the closest of the two to the center, the log entry 7030 (having GPS point P4 and timestamp T4), is associated with grid center point C3, which is referred to as the grid cell identifier C3 of cell 7230. In another implementation, a predetermined one of the log entries within the bounds of a single cell is selected. For example, each first log entry or last log entry that falls within the bounds of the single cell may be chosen. This latter implementation avoids any need to make an analysis of the distances between the center and locations associated with each of the log entries. When the first log entry is used as shown in FIG. 8B, the log entry 7020 (having GPS point P3 and timestamp T3), is associated with the grid cell identifier C3 of cell 7230

Like the log entries 7000 and 7010, the log entries 7040 and 7050 are the only log entries within the bounds of their respective cells, namely cells 7240 and 7260. Therefore, the log entry 7040 (having GPS point P5 and timestamp T5) located within the bounds of cell 7240 is associated with grid center point C4, which is referred to as the grid cell identifier C4 of cell 7240. Similarly, the log entry 7050 (having GPS point P6 and timestamp T6) located within the bounds of cell 7260 is associated with grid center point C6, which is referred to as the grid cell identifier C6 of cell 7260.

Defining the grid cells using the trip data is the start of breaking the trip into smaller trips to generate the travel segments. Within the log entries of a trip, any two consecutive locations (e.g., GPS points) may be within neighboring cells of the grid. Referring again to FIG. 6, this involves merging log entries within a cell at 6300 and interpolating one or more missing log entries at 6400.

Merging log entries at 6300 may include omitting the non-selected log entries from the processing at 6200. For example, the log entries 7020, 7030 may be merged by using the log entry 7020 and omitting the log entry 7030 as shown in FIG. 8B. An alternative way to merge the log entries within a cell at 6300 is to average the data from the log entries—e.g., averaging the GPS points and averaging the timestamps to obtain values for the first column and the second column of FIG. 8B.

Interpolating one or more missing log entries at 6400 includes, if a cell along a route of a trip has no log entry, interpolating a log entry using adjacent log entries. This is shown by example in FIGS. 7B and 8B. There is no log entry having a location within the bounds of the cell 7250 as shown in FIG. 7B. The GPS point for the cell 7250 may be obtained by interpolating using GPS point P5 for the cell 7240 and GPS point P6 for the cell 7260 according to (P5+P6)/2. Similarly, the timestamp for the cell 7250 may be obtained by interpolating using timestamp T5 for the cell 7240 and timestamp T6 for the cell 7260 according to (T5+T6)/2. This manufactured log entry is associated with grid center point C5, which is referred to as the grid cell identifier C5 of cell 7250.

While the processing at 6200-6400 is described with respect to only one trip, the processing may be repeated for a number of trips. That is, using the sequential GPS coordinates in each trip, a trip can be broken down into smaller trips (sub-trips) between consecutive GPS coordinates. In this case, the n-th GPS coordinates correspond to the start location of a sub-trip, the n-th timestamp corresponds to the start time of the sub-trip, the (n+1)-th GPS coordinates correspond to the end location of the sub-trip, and the (n+1)-th timestamp corresponds to the end time of the sub-trip. At 6500, these processed, consecutive log entries may be used to define continuous segments by merging sequential shorter sub-trips. Using the single trip of FIG. 8C, the continuous segments are C1-C2, C1-C3, C1-C4, C1-C5, C1-C6, C2-C3, C2-C4, C2-C5, C2-C6, C3-C4, C3-C5, C3-C6, C4-C5, C4-C6, and C5-C6. Each of these segments may have is associated with a start and end location and a start and end timestamp. At 6600, the current timestamp of a respective log entry associated with each cell along the route is transformed to a day and a time of day. This transformation may not be limited to those log entries forming the segments, and instead may be performed earlier in the process for the log entries before processing them using the grid.

FIG. 9 is a table showing driving segments resulting from the method 6000 of FIG. 6. Only two segments are shown for simplicity, and the data within the table is developed using the data of FIGS. 7A-8B. The first column in the table of FIG. 9 is a continuous segment identifier (ID). In this example, the continuous segment C1-C2 is identified as continuous segment ID 1, and the continuous segment C1-C3 is identified as continuous segment ID 2. The second and third columns include, respectively, the start grid and end grid centers of the segment, and the fourth and fifth columns include, respectively, the start and end timestamps of the segment. This columns are populated using the data of FIG. 8B. The final columns of FIG. 9 include, respectively, the start day of week, the end day of week, the start time of day, and the end time of day, for each continuous segment. This data is obtained from the conversions of the start and end timestamps at 6600.

As mentioned, FIG. 6 shows the processing for one trip made by one vehicle. Similar processing would be performed for other vehicles to which it is desired to match a service. A size of the cells of the grid 7200 indicate a maximum acceptable deviation distance from a travel segment generated using the trips. For example, the diagonal of the cells of the grid may represent the longest distance the operator of the vehicle is willing to travel out of the way for a drop off or a pick up from its driving history. Grid size is thus personalized for each user such that the size of the cells of a first grid associated with one vehicle is different from the size of the cells of a second grid associated with another vehicle. Initially, the grid size may have a default value, but the size of the cells of the grid may be varied with usage. More specifically, the value may be updated based on the acceptance and/or rejection of matches by the operator of the vehicle. When the operator accepts a number of service requests that are associated with locations within the current grid size, but rejects others with locations that are within the current grid size but outside of the ranges of those accepted, the size of the cells of the grid may be updated by reducing the size of the cells using the locations of those rejected so that they would be outside the new grid size. The operator may also see a number of requests outside of its driving history—that is, the operator may see a service request that is associated with a location that is outside of a start cell identifier and an end cell identifier of its travel segments. These service requests are discussed in more detail below, but it is noted now that if the operator accepts a number of service requests that have such outside locations, that the size of the cells may updated by increasing the size of the cells of the grid for future matching.

The method of FIG. 6 uses an example of one trip to generate driving segments. However, similar processing would be performed for multiple trips within the driving history of a vehicle. The resulting segments may be within a single trip or over consecutive trips. To limit the patterns formed by combining sub-trips of adjacent or consecutive trips, a defined maximum duration from the start time to the end time for the continuous segments may be set. One example of a value for the maximum duration is 6 hours. In this case, the method 6000 of FIG. 6 will combine sub-trips into continuous segments of up to 6 hours. Combinations of sequential sub-trips that would result in continuous segments of larger than 6 hours would be omitted.

The segments resulting from the method 6000 of FIG. 6 could be used for processing in the method 4000 of FIG. 4 at 4200-4400. However, benefits would result from further processing that identifies those of the segments that are repetitive or routine, and hence generally predictable for use in the matching. Therefore, generating the travel segments in the method 6000 may include additional operations to this end.

Namely, the records for the continuous segments may be grouped by vehicle identifier, start cell identifier, end cell identifier, and start day of week into a first group. Density-based clustering may then be applied to the start time of day using the first group based on a density parameter. The density based clustering may be any algorithm such as, for example, DBSCAN, that can form a plurality of clusters respectively comprising records having a similar start time of day. The density parameter may comprise a number of records per unit of time that can be determined experimentally and used as a default value. Clustering for the end time of day is performed independently in a like manner. That is, records for continuous segments are grouped by vehicle identifier, start cell identifier, end cell identifier, and end day of week into a second group. Then, density based clustering is applied to an end time of day using the second group based on the density parameter to form a plurality of clusters respectively comprising records having a similar end time of day.

Those continuous segments that have a non-repeating time of day are classified as noise by the clustering algorithm and are ignored for further processing and matching. That is, for example, records of the first group and of the second group that do not satisfy the density parameter are ignored. This means that there are insufficient records associated with a particular range of start times to classify those records as a repeated (predictable) continuous segment.

At least some of the plurality of clusters form respective travel segments for the comparisons of FIG. 4. For each time of day cluster, for example a cluster formed using the first group, the start time for a travel segment may be defined as a start time range from a 10th percentile value to a 90th percentile value of the records (e.g., the start time of the records) forming the cluster. Similarly, for a cluster formed using the second group, the end time for a travel segment may be defined as an end time range from a 10th percentile value to a 90th percentile value of the records (e.g., the end time of the records) forming the cluster.

The final processed data may be used for matching package deliveries or other travel segment-dependent matching services as described with respect to FIG. 4. For new driving history, similar processing of trips as described with respect to FIG. 6 is performed and optionally, density clustering may be performed using previously-processed data that corresponds to the new continuous segments. The updated processed driving history can replace the existing history of the continuous segments used for matching.

Figure 10:
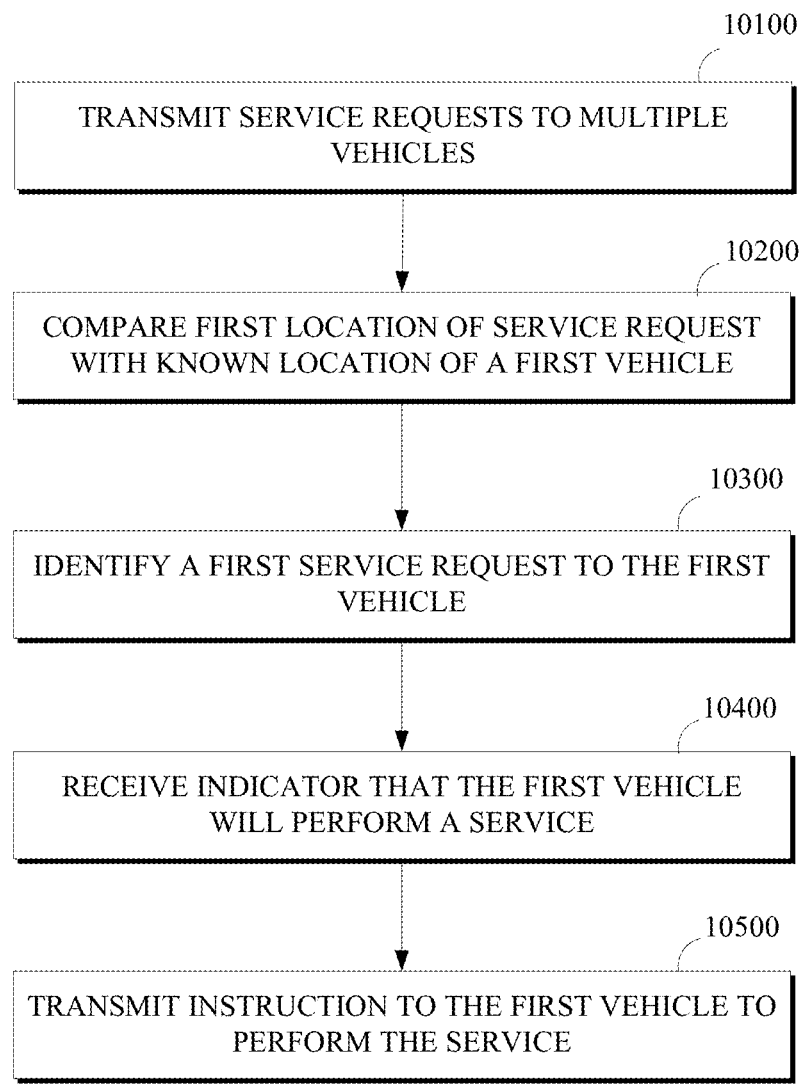
FIG. 10 is a flow chart diagram showing a method of implementing an incentivized group shipping system.

The processes of matching of a vehicle driving history to a service and of optionally processing the vehicle driving history into driving segments for the matching may be used to implement various implementations of an incentivized group shipping system. FIG. 10 is a flow chart diagram showing one example of a method 10000 of implementing an incentivized group shipping system.

At 10100, service requests may be transmitted to multiple vehicles. The service requests may be transmitted wirelessly from, for example, the communicating device 2400 of FIG. 2. Each service request may be associated with a respective first time and with a respective location. The locations are identified by one or more unique identifiers, including but not limited to an address, GPS coordinates, dimensions for latitude and longitude. The service requests may be transmitted to the controller 1300 of the vehicle 1000 through its electronic communication interface 1370 as shown in FIG. 1, for example. The service requests may be transmitted to the multiple vehicles by, for example, transmitting the service requests to operators of the multiple vehicles through an application running on a personal computing device, such as lap top, a smart phone, or tablet. At least some of the service requests may be or include a request to deliver a package.

The service requests may be received from a plurality of service users. For example, a service user (or shipper when a package is involved) may register for the service through an application running on a personal computing device, such as lap top, a smart phone, or tablet. A corresponding entry is then stored, e.g., in a central database stored within the communicating device 2400 or elsewhere. The status of the service can be tracked through the database. The following parameters may be stored in association with the service request responsive to input by the service user: user details and user account; a start location; an end location; pick up and/or delivery time windows; weight; dimensions; type of content, such as fragile, perishable, etc.; handling instructions; and delivery instructions. The parameters stored with the service request entry may vary with the type of service.

In the method 10000, the driving histories of at least some of the multiple vehicles are known. In some implementations, the driving histories of all vehicles are known. It may be a condition to become a service provider that the vehicle driving history be made available. A first location associated with a first service request is compared with a known location in a first driving history of at least a first vehicle at 10200. The first vehicle may be one of the multiple vehicles and receive the service requests responsive to the transmission at 10100, or it may not. Like the matching of FIG. 4, the known location can be a first cell identifier of a first grid that includes cells. The first cell identifier can be GPS coordinates of a center location of cell, but other ways of uniquely identifying or naming the cell are possible. A size of the cells of the first grid indicate a maximum acceptable deviation of the first vehicle from a travel segment in the first driving history that includes the first cell identifier as discussed with respect to FIG. 6.

Upon conditions that the first location matches the known location and the first time associated with the first location overlaps a start time or an end time of the travel segment that includes the first cell identifier, the first service request is identified to the first vehicle at 10300. The first service request may be one of the service requests, or it may be a service request sent only to those vehicles matching the conditions. If it is sent with the other service requests, the first service request is identified as a match to the operator of the vehicle by highlighting, a notation, or other identifier. In some implementations, the operator may receive only those service requests that match their driving history.

At 10400, an indicator that the first vehicle will perform a service associated with a service request, e.g., of the service requests, is received from the first vehicle. For example, if the first service request or other service request that is identified to the operator of the first vehicle is of interest to the operator, the operator can contact the service user through the application mentioned previously or otherwise to negotiate terms for payment for the service. Once the service user and operator mutually agree, the entry within the central database may be updated with the operator's details, such as identity and account information. The update may be made by the service user, but more commonly the operator would do so by accepting a request through an interface provided by the application.

At 10500, an instruction is transmitted to the first vehicle that causes the first vehicle to perform at least the portion of the service. This could be similar to the processing described at 4700 in the method 4000 of FIG. 4. The instruction here, or in the earlier method, can also incorporate more than one instruction. For example, as part of the terms for a package delivery service, the operator and service user can agree to on-loading and/or off-loading the package in the absence of the operator of the vehicle. This would involve one or more instructions to the first vehicle from the application, the service user and/or the operator.

One technique for transmitting an instruction that causes a cargo carrier of the first vehicle to open (and optionally close) is using an access token. The service user may request an access token as part of the service request or thereafter during finalization of the transaction with the operator. The operator can consent to each request at the time of receipt, or can establish a rule within the application to automatically accept an access token request once an associated service request is accepted. That is, the request for the access token may be received from the service user from who the service request for the service was received. The request may be received, e.g., at the communication device 2400, through the application. Permission to transmit the access token may be received from an operator of the first vehicle, and then the communication device 2400 may transmit the access token to the service user. The access token may have a limited time of use and a limited number of uses, and the access token may trigger the instruction, e.g., to open a cargo carrier such as a trunk, when a recipient of the access token is within a defined distance of the first vehicle. For example, the access token may be stored on a smart phone and trigger the opening of the cargo carrier when the smart phone is within 5 meters of the vehicle and the time is within the limited period of time associated with a pick-up or drop-off window. The access token may have one use or two uses, for example, and the recipient of the access token may be a recipient of a package sent by the service user, the recipient receiving the access token from the service user.

A vehicle telematics service may be associated with issuing instructions and other communications to cause at least a portion of the service to be performed. For example, a telematics unit of a vehicle may be constantly connected to a telematics data center via a real-time message framework, for example MQTT. The telematics data center can receive the access token and the corresponding conditions on its use, and can also receive the request for a remote cargo release from the service user and/or a package recipient. The telematics data center can verify the access token if its corresponding conditions of use are met in order to push a message for remote cargo release to the vehicle. The telematics unit on the vehicle can receive and act on the message. Optionally, the telematics unit on the vehicle will send a trunk close message to the data center. The data center can monitor for this message. If the message is not received within a defined time, a notification may be sent to the operator, the service user (i.e., the sender) or recipient, or both.

In some implementations when the service includes a package delivery, the service user may monitor the package in one or more ways. For example, the service user could track the operator's progress through the receipt of GPS signals provided through the application. A camera (e.g., with a wide-view lens) and an interior light may be established within the cargo carrier for capturing and wirelessly or otherwise transmitting images of the package within the cargo carrier. In this case, images from the camera can be acquired for key events such as on-loading and off-loading and may also be triggered for events such as aggressive acceleration and braking events. The images may be received from the vehicle by, for example, the telematics data center previously discussed and shared with the operator, the service user (or sender) and/or the recipient.

When the service is complete, transmitting a message to an operator of the first vehicle, transmitting a message to the service user originating the service request, or both, may be done. The service request can be marked complete within the central database, or can be removed to a separate list of closed matters.

The method 10000 of FIG. 10 describes identifying a matched service request to a single vehicle and the acceptance of one service request by a single vehicle. However, and as described with respect to FIG. 4, a service request may be compared to the driving histories on multiple vehicles, and hence the service request may be matched with more than just the first vehicle. Namely, for example, the first location may be compared with a known location in a second driving history of a second vehicle, the known location in the second driving history comprising a second cell identifier of a second grid, the second grid comprising cells, and a size of the cells of the second grid indicating a maximum acceptable deviation of the second vehicle from a travel segment including the second cell identifier in the second driving history. As mentioned previously, the size of the grids for each vehicle may have the same default value, but may also be different. The first service request may then be identified to the second vehicle upon conditions that the first location matches the known location in the second driving history and the first time associated with the first location overlaps a start time or an end time of the travel segment including the second cell identifier.

In some implementations, a list of vehicles may be transmitted to an originator of a service request where the list of vehicles includes each vehicle having a known location that matches a location associated with the service request and having a start time or an end time that overlaps a time associated with the service request.

The service request indicated at 10400 may be the matched first service request described at 10300, but it may not be. The first vehicle can opt to receive service requests that are not matches in some implementations. Further, the method 10000 of FIG. 10 describes identifying a matched service request using only a single location and associated time. As described with respect to FIG. 4, matching a service request with a vehicle may be achieved using start and end locations and start and end times.

The teachings herein describe group shipping system that is flexible to various scenarios and relationships among the service user, the service provider (a vehicle and its operator), the recipient, if any, and the service itself through an application interface with the participants. For example, an operator of a vehicle can proactively select from a list of services provided through the application, negotiate terms with the service user, and perform all or part of the service. In this way, the operator can perform any number of services based on their preferences. The operator could instead elect only to be notified of service requests that conform to their regular, or repeating, driving histories, thus limiting their travel outside of their expected future plans. The group shipping system also works with fully autonomous or tele-operated semi-autonomous vehicles due to the ability to remotely control access to such vehicle for provision of the service associated with a service request.

The group shipping system may be incentivized in order to encourage its use. According to one technique of recruiting new operators with a vehicle having a known driving history, the driving history may be processed and matched against existing open service requests and closed service requests according to the techniques previously described. Then, a report of the money earned in performing the services and also an estimate of the reduction of waste and emissions from the overall transportation ecosystem may be provided to the potential recruit. To estimate the reduction of waste and emissions, an energy cost associated with performing each of the matched services, for example transporting a package from a start location to an end location, may be calculated. This energy cost may be used as an estimate of the cost of a dedicated package delivery service to deliver the package. Because the operator would be performing the service without significant departure from a normal trip segment, the cost to the overall transportation ecosystem would likely be reduced. New service users could be recruited by developing reports on previous service requests. For example, the report could use previous package delivery routes and rates to show availability and costs. Further, response times and the availability of vehicles on popular routes may be distributed. The application may also include the ability to accept a potential start and end location for package delivery from potential sender, and transmit a report showing vehicle availability, cost, and response time.

With this system, any operator in a network can be notified and offered a payment to perform a service. The system records the driving habits of operators in the network of connected cars. When a service user (customer) accesses the system to make a service request that involves a travel segment, the service can, through predictive analytics of the driving data, predict which operators are most likely to travel along a similar travel segment and offer a transaction to those operators. The operators can then accept on a proposed price or bid on a price they are willing to accept. There are many ways in which a transaction can take place. The service user can request pickup at a location and delivery at a specific location, in which the matched and accepting operator would cause a vehicle to drive to both locations. Alternatively, the service user can go to the matched vehicle before a specified time. Once the service user arrives, the system can automatically unlock the vehicle, trunk, or external cargo carrier, allowing the service user to place a package inside. A notification can then be sent to the operator that the package is there. In another variation, the service user may not choose a door or address to receive a delivery. The receiver of the package can go to the parked vehicle to retrieve the package. Upon arrival at the vehicle, the system can automatically unlocks the vehicle, trunk, or external cargo carrier, allowing the receiver to retrieve the package. A notification can then be sent to the operator and the service user that the package has been retrieved. Other scenarios are possible.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature" or "element" indicates serving as an example, instance or illustration. Unless expressly indicated, any example, embodiment, implementation, aspect, feature or element is independent of each other example, embodiment, implementation, aspect, feature or element and may be used in combination with any other example, embodiment, implementation, aspect, feature or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature or element may be used independently or in various combinations with or without other aspects, features and elements.

The above aspects, examples and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method, comprising:
    transmitting service requests to multiple vehicles, each service request associated with a respective first time and with a respective location, and driving histories of at least some of the multiple vehicles being known, wherein a driving history of the driving histories for a vehicle comprises periodic log entries for multiple separate trips of the vehicle, a log entry of the periodic log entries comprising a timestamp and a position of the vehicle;
    for at least some trips of a first driving history of a first vehicle of the multiple vehicles, generating travel segments from a trip by:
        defining a first grid of cells having respective cell identifiers, a size of the cells of the first grid indicating a maximum acceptable deviation of the first vehicle from a travel segment in the first driving history; and
        for successive log entries of the trip, associating the log entry with a respective cell of the first grid based on proximity to the respective cell, wherein the cells of the first grid associated with the successive log entries define a continuous path of travel segments between adjacent cells that starts at a cell associated with a start position of the trip and ends at a cell associated with an end position of the trip, and wherein each cell is associated with a respective timestamp of the one or more successive log entries associated with the cell;
    comparing a first location associated with a first service request with the cells of the first grid;
    upon a condition that the first location matches a cell location of a first cell of the adjacent cells of the first grid, and a condition that the first time associated with the first location overlaps a start time or an end time of the first cell of the adjacent cells of the first grid, identifying the first service request to the first vehicle;
    receiving, from the first vehicle, an indicator that the first vehicle will perform a service associated with a service request;
    transmitting an instruction to the first vehicle that causes the first vehicle to perform at least a portion of the service; and
    updating the size of the cells of the first grid based on a location associated with the service request indicated by the indicator.

2. The method of claim 1, wherein at least some of the service requests comprise a request to deliver a package.

3. The method of claim 1, further comprising:
for at least some trips of a second driving history of a second vehicle of the multiple vehicles, generating travel segments from a trip by:
defining a second grid of cells having respective cell identifiers, a size of the cells of the second grid indicating a maximum acceptable deviation of the second vehicle from a travel segment in the second driving history; and
for successive log entries of the trip of the second driving history, associating the log entry with a respective cell of the second grid based on proximity to the respective cell, wherein the cells of the second grid associated with the successive log entries define a continuous path of travel segments between adjacent cells that starts at a cell associated with a start position of the trip and ends at a cell associated with an end position of the trip, and wherein each cell is associated with a respective timestamp of the one or more successive log entries associated with the cell;
comparing the first location with the cells of the second grid; and
upon a condition that the first location matches a cell location of a first cell of the adjacent cells of the second grid, and a condition that the first time associated with the first location overlaps a start time or an end time of the first cell of the adjacent cells of the second grid, identifying the first service request to the second vehicle.

4. The method of claim 3, wherein:
the size of the cells of the first grid is different from the size of the cells of the second grid.

5. The method of claim 1, wherein:
the service request indicated by the indicator is the first service request; and
updating the size of the cells of the first grid comprises reducing the size of the cells of the first grid.

6. The method of claim 1, wherein:
the service request indicated by the indicator is associated with a location that is outside of a start cell identifier and an end cell identifier of travel segments within the first driving history of the first vehicle; and
updating the size of the cells of the first grid comprises increasing the size of the cells of the first grid.

7. The method of claim 1, wherein the instruction comprises an instruction that causes a cargo carrier of the first vehicle to at least one of open or close.

8. The method of claim 1, further comprising:
transmitting a message to an operator of the first vehicle when the service is complete.

9. The method of claim 1, further comprising:
receiving the service requests from a plurality of service users; and
transmitting a message to an operator of the first vehicle and to a service user from whom the service request for the service was received when the service is complete.

10. An apparatus, comprising:
a processor; and
a memory storing instructions causing the processor to perform a method comprising:
transmitting service requests to multiple vehicles in a transportation system, each service request associated with a respective first time and with a respective location, and driving histories of at least some of the multiple vehicles being known, wherein a driving history of the driving histories for a vehicle comprises periodic log entries for multiple separate trips of the vehicle, a log entry of the periodic log entries comprising a timestamp and a position of the vehicle;
for at least some trips of a driving history of a respective vehicle of the multiple vehicles, generating travel segments from a trip by:
defining a grid of cells for the vehicle, the grid having respective cell identifiers, and a size of the cells of the grid indicating a maximum acceptable deviation of the vehicle from a travel segment in the driving history;
for successive log entries of the trip, associating the log entry with a respective cell of the grid based on proximity to the respective cell, wherein the cells of the grid associated with the successive log entries define a continuous path of travel segments between adjacent cells that starts at a cell associated with a start position of the trip and ends at a cell associated with an end position of the trip, and wherein each cell is associated with a respective timestamp of one or more successive log entries associated with the cell; and
eliminating a travel segment that is below a density parameter comprising a number of records per unit of time, the density parameter indicating that the travel segment is repetitive or routine only when the travel segment is above the density parameter;
comparing a first location associated with a first service request with the cells of a first grid for a first vehicle and the cells of a second grid for a second vehicle;
upon a condition that the first location matches a cell location of a first cell of the adjacent cells of the first grid, and a condition that the first time associated with the first location overlaps a start time or an end time of a travel segment that includes the first cell of the adjacent cells of the first grid:
identifying the first service request to the first vehicle;
receiving, from the first vehicle, an indicator that the first vehicle will perform a service associated with the first service request; and
transmitting an instruction to the first vehicle that causes the first vehicle to perform at least a portion of the service;
otherwise, upon a condition that the first location matches a cell location of a first cell of the adjacent cells of the second grid, and a condition that the first time associated with the first location overlaps a start time or an end time of a travel segment that includes the first cell of the adjacent cells of the second grid:
identifying the first service request to the second vehicle;
receiving, from the second vehicle, an indicator that the second vehicle will perform a service associated with the first service request; and
transmitting an instruction to the second vehicle that causes the second vehicle to perform at least a portion of the service, such that energy cost to the transportation system is reduced over using the first vehicle for performing the service associated with the first service request; and
updating the size of the cells of the first grid based on a location of a service request of the transmitted service requests and whether or not the first vehicle accepts or rejects the service request.

11. The apparatus of claim 10, wherein the method further comprises:
transmitting a list of vehicles from the multiple vehicles to an originator of the first service request, the list of vehicles including each vehicle of the multiple vehicles having a cell located along a travel segment that matches the first location and having a start time or an end time that overlaps the first time.

12. The apparatus of claim 10, wherein the method further comprises:
receiving a request for an access token from a service user from whom the first service request was received;
receiving permission to transmit the access token from an operator of the first vehicle; and
transmitting the access token to the service user.

13. The apparatus of claim 12, wherein:
the access token has a limited time of use and a limited number of uses, the access token triggering an instruction when a recipient of the access token is within a defined distance of the first vehicle.

14. The apparatus of claim 13, wherein:
the recipient of the access token is a recipient of a package sent by the service user, the recipient receiving the access token from the service user.

15. An apparatus, comprising:
a processor; and
a memory storing instructions causing the processor to perform a method comprising:
transmitting service requests to multiple vehicles, at least some of the service requests associated with a start time, an end time, a start location, and an end location, and driving histories of at least some of the multiple vehicles being known, wherein a driving history of the driving histories for a vehicle comprises periodic log entries for multiple separate trips of the vehicle, a log entry of the periodic log entries comprising a timestamp and a position of the vehicle;
for at least some trips of a first driving history of a first vehicle of the multiple vehicles, generating travel segments from a trip by:
defining a first grid of cells having respective cell identifiers, a size of the cells of the first grid indicating a maximum acceptable deviation of the first vehicle from a travel segment in the first driving history; and
for successive log entries of the trip, associating the log entry with a respective cell of the first grid based on proximity to the respective cell, wherein the cells of the first grid associated with the successive log entries define a continuous path of travel segments between adjacent cells that starts at a cell associated with a start position of the trip and ends at a cell associated with an end position of the trip, and wherein each cell is associated with a respective timestamp of one or more successive log entries associated with the cell;
comparing each of the start location and the end location associated with a first service request with the cells of the first grid;
upon a condition that the start location of the first service request matches a cell location of a first cell of the first grid, a condition that the end location of the first service request matches a second cell of the first grid that is subsequent to the first cell along the continuous path, a condition that the start time of the first service request overlaps a time associated with the first cell, and a condition that the end time of the first service request overlaps a time associated with the second cell, identifying the first service request to the first vehicle;
receiving, from the first vehicle, an indicator that the first vehicle will perform a service associated with the first service request;
transmitting an instruction to the first vehicle that causes the first vehicle to perform at least a portion of the service;
assigning an access token to a recipient, the access token having a limited time of use and a limited number of uses, the access token enabling access by the recipient to first vehicle when the recipient is at the end position of the first service request within a period of time associated with the end time; and
updating the size of the cells of the first grid based on a location of a service request of the transmitted service requests and whether or not the first vehicle accepts or rejects the service request.

16. The apparatus of claim 15, wherein the indicator indicates that the first vehicle will perform a first service associated with the first service request.

17. The apparatus of claim 16, wherein the method further comprises:
calculating an energy cost associated with performing the first service, the first service including transporting a package from the start location to the end location.

18. The apparatus of claim 15, wherein:
the instruction is a remote trunk release to the first vehicle; and the method further comprises:
monitoring the first vehicle for a trunk close message from the first vehicle; and
upon a condition that the trunk close message is not received with a defined time, transmitting a notification to an operator of the first vehicle.

19. The apparatus of claim 15, wherein:
each service request is associated with a start day of week and an end day of week;
the start time is a start time range;
the end time is an end time range;
the start time of the first service request overlaps the time associated with the first cell when a start day of week of the first service request matches a day of week associated with the first cell and the start time range overlaps the time associated with the first cell; and
the end time of the first service request overlaps the time associated with the second cell when an end day of week of the first service request matches a day of week associated with the second cell and the end time range overlaps the time associated with the second cell.

* * * * *